(12) United States Patent
Tanner

(10) Patent No.: US 10,584,808 B1
(45) Date of Patent: Mar. 10, 2020

(54) PIPE GUIDE

(71) Applicant: Jared Tanner, Orem, UT (US)

(72) Inventor: Jared Tanner, Orem, UT (US)

( * ) Notice: Subject to any disclaimer, the term of this patent is extended or adjusted under 35 U.S.C. 154(b) by 181 days.

(21) Appl. No.: 15/953,338

(22) Filed: Apr. 13, 2018

Related U.S. Application Data

(60) Provisional application No. 62/485,160, filed on Apr. 13, 2017.

(51) Int. Cl.
*G01B 5/25* (2006.01)
*F16L 1/10* (2006.01)
*F16L 1/024* (2006.01)

(52) U.S. Cl.
CPC .............. *F16L 1/10* (2013.01); *F16L 1/0243* (2013.01)

(58) Field of Classification Search
CPC .......................................................... F16L 1/10
USPC ................................... 33/529, 533, 613, 645
See application file for complete search history.

(56) References Cited

U.S. PATENT DOCUMENTS

| | | | |
|---|---|---|---|
| 3,589,657 A * | 6/1971 | Pendley | F16L 3/24 248/68.1 |
| 4,160,477 A | 7/1979 | Roffler | |
| 4,375,724 A * | 3/1983 | Brock | G01B 5/24 33/529 |
| 4,878,332 A | 11/1989 | Drake | |
| 5,598,682 A | 2/1997 | Haughian | |
| 6,000,459 A | 12/1999 | Jeppesen | |
| 6,077,000 A * | 6/2000 | Gibbons | B23B 47/28 33/529 |
| 6,945,735 B1 * | 9/2005 | Doverspike | F16L 1/09 248/207 |
| 2003/0198520 A1 * | 10/2003 | Evans | F16L 1/10 405/184.4 |
| 2014/0290027 A1 * | 10/2014 | de Souza Filho | F16L 58/181 29/428 |
| 2019/0210297 A1 * | 7/2019 | McElroy, II | B29K 2023/00 |

* cited by examiner

*Primary Examiner* — George B Bennett
(74) *Attorney, Agent, or Firm* — Amy Fiene PC; James Sonntag

(57) ABSTRACT

A pipe guide for laying radiant heat tubing includes a member with cutouts spaced along a flat surface of the member, the cutouts being spaced apart and configured to efficiently space pipes apart from each other by a predetermined distance.

19 Claims, 7 Drawing Sheets

PIPE GUIDE

BACKGROUND

A room, especially a room with a concrete slab in the dead of winter, can become so cold as to render the room almost completely useless. To restore functionality to cold rooms, homeowners and building owners have turned to the solution of underfloor radiant heating. This type of heating benefits both rooms with concrete slabs as well as rooms with other types of flooring, such as hardwood, plywood, or panel flooring.

For installation, radiant heat tubes may be installed either above or below the subfloor. Regardless of the level of installation, it is often challenging to lay the tubing evenly spaced apart so as to avoid uneven heat distribution. To ensure even spacing, plywood may be manufactured with pre-cut grooves in which the tubing may be installed. However, this creates a time-consuming challenge of measuring and documenting the location of installed heating tube, forming each sheet of plywood to match the tube configuration for its location, and connecting sections of plywood to conform to the specifications of a given room. This challenge is magnified when shaping tubes to fit corners, curves, ground vents, columns, and other barriers that exist along the floor of a room.

Consequently, a need exists for improvements of laying radiant heat tubing.

SUMMARY

An exemplary pipe guide for laying radiant heat piping comprises an elongated member that is elongated along a linear straight axis. The member includes a first flat surface with a plurality of cutouts open in the first flat surface. Each cutout forms a groove with a free unobstructed path perpendicular to the axis. The spacing between the plurality of cutouts is equal. The member has a first end and second end with a straight perpendicular edge to the linear straight axis at the flat surface, the first and second end configured to abut a previous pipe when aligning a new pipe with respect to the previous pipe. The member is further shaped for manual handling by a user.

An exemplary pipe guide includes that the distance between the first or second end of the member and a nearest of the plurality of cutouts is the same as the spacing between each cutout.

Another exemplary pipe guide includes that the distance between the first or second end of the member and a nearest of the plurality of cutouts is spaced between and from ends at different ratios instead of being equally spaced apart.

DETAILED DESCRIPTION

The following relates to a tool that reduces labor costs by speeding up the installation process of laying radiant heat tubing, all while keeping proper spacing needed for heat loss calculations.

An exemplary pipe guide for laying radiant heat piping comprises an elongated member that is elongated along a linear straight axis. The member includes a first flat surface with a plurality of cutouts open in the first flat surface. Each cutout forms a groove with a free unobstructed path perpendicular to the axis.

The member has a first end and second end with a straight perpendicular edge to the linear straight axis at the flat surface, the first and second end configured to abut a previous pipe when aligning a new pipe with respect to the previous pipe. For example, embodiments include that the guide have at least one front or back straight edge that is perpendicular to the linear axis and that converges with the first flat surface to form a right angle. An exemplary front or back straight edge may be in the form of a surface, such as a solid or semi-solid, flat or semi-flat, surface. The surface may extend from ends of opposing sides of the member.

Along the first flat surface is a plurality of cutouts. The spacing between the plurality of cutouts is equal or unequal. The distance may be uniformly equal or have only a limited portion that is equally spaced with cutouts. Exemplary cutouts shown include a semi-circular or arc shape that is configured to generally conform to the arc shape in a radiant heat pipe or other pipe.

The member is further shaped for manual handling by a user.

An exemplary pipe guide includes that the distance between the first or second end of the member and a nearest of the plurality of cutouts is the same as the spacing between each cutout.

Another exemplary pipe guide includes that the distance between the first or second end of the member and a nearest of the plurality of cutouts is spaced between and from ends at different ratios instead of being equally spaced apart.

Figure 1:
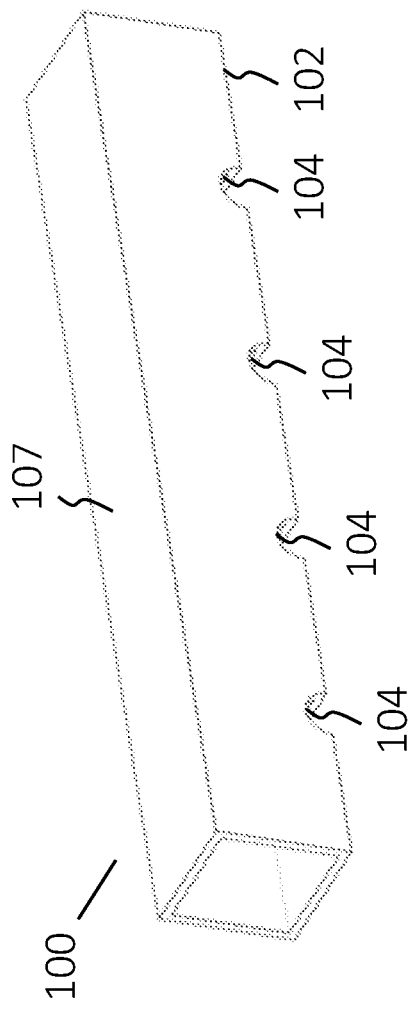
FIG. 1 shows a perspective view of a pipe guide.
Figure 2:
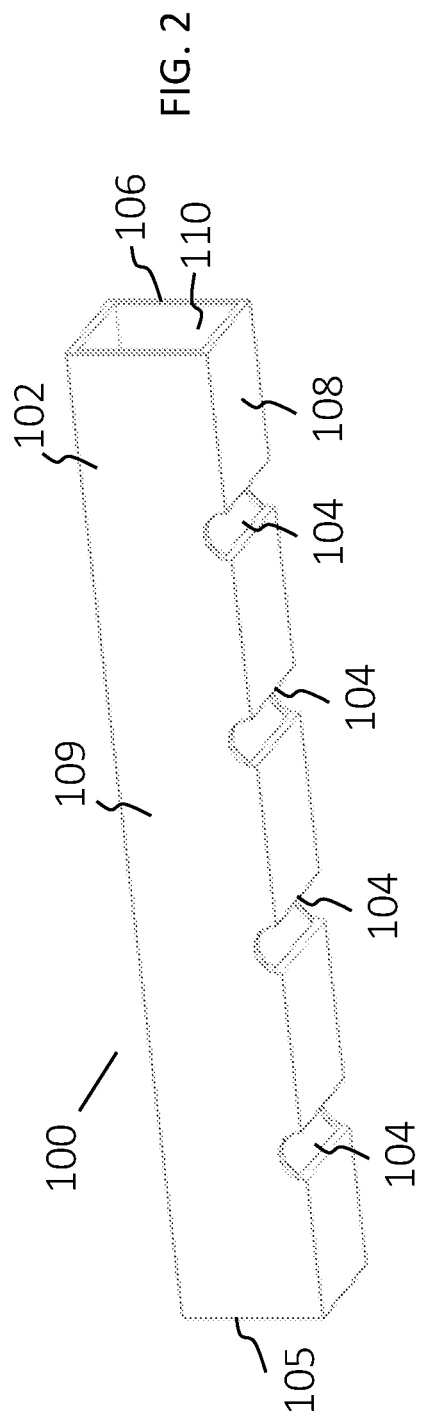
FIG. 2 shows a perspective view of a pipe guide.

FIGS. 1 and 2 show perspective views of an exemplary pipe guide 100. The guide 100 for laying radiant heat piping comprises an elongated member 102 that is elongated along a linear straight axis. In some embodiments, the first end and second end are surfaces. For example, the member 102 may be in the form of an elongated block. For the block shape shown, the member 102 includes a top surface 107 and a bottom surface 108, front surface 109 and back surface 110, and opposing end surfaces 105 and 106. The opposing end surfaces are shown as being square, but they may also be rectangular. The top 107 and bottom surface 108 and the front 109 and back surface 110 are rectangular. Other shapes, contours, and sizes are possible.

Figure 6:
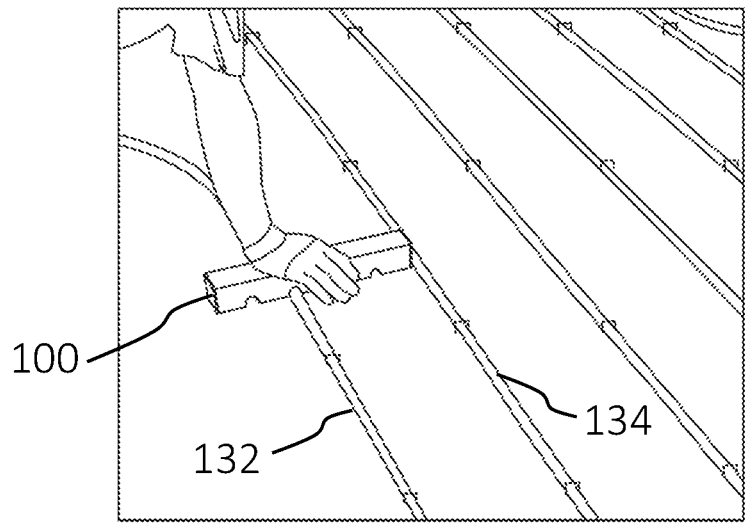
FIG. 6 shows a pipe guide in use.

The bottom surface 108 includes a plurality of cutouts 104 open at the bottom surface 108. Each cutout 104 forms a groove with a free unobstructed path perpendicular to the linear straight axis. The spacing shown between the plurality of cutouts (e.g., from centerline to centerline) is equal. The member 102 has a first end 105 and second end 106, each end configured with a straight perpendicular edge to the axis at the flat surface, the first end 105 and second end 106 configured to abut a previous pipe when aligning a new pipe with respect to the previous pipe as shown in FIG. 6.

Figure 4:
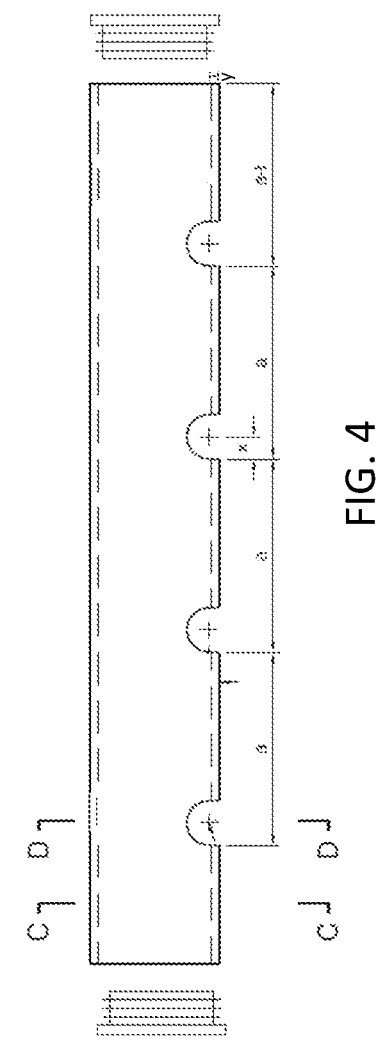
FIG. 4 shows a front view of a pipe guide.

The pipe guide 100 shown includes that the distance between the first or second end of the member and a nearest of the plurality of cutouts 104 is the same as the spacing between each cutout as shown in FIG. 4. The cutouts are equally spaced from each other to provide uniformity in laying out pipes. This is particularly advantageous to enable an optimal heat distribution pattern in a given room.

In another variation, an exemplary pipe guide includes that the distance between the first or second end of the member and a nearest of the plurality of cutouts is spaced between and from ends at different distances or ratios instead of being equally spaced apart.

While the block is shown with four cutouts spaced at equal intervals, the cutouts may include more or less than four cutouts and may be spaced at unequal intervals. For example, the cutouts may be spaced in ratios, such as x, 1.5x, 2x, and 2.5x, where x is a distance from an end of the block to a nearest cutout. Also, the height and width of the block may be more than twice the height of the cutouts. Also, the cutouts may have varying depths, radii, and shapes.

In the example shown in FIGS. 1-6, the cutouts 104 are located along one surface 108 of the block and are spaced at equal distances from each other. The shape of the cutouts 104 are congruent to each other, each cutout including an arc shape that generally conforms to an arc shape of a pipe. As shown, the cutouts 104 include a semi-circle that is a half circle with ends of the semi-circle extended by an additional amount perpendicularly outward relative to the linear straight axis. In this manner, the shape includes a semi-circle that adjoins a rectangle to provide both shapes.

An alternative variation includes a second flat surface having a plurality of cutouts in addition to the cutouts on the first flat surface such that a plurality of cutouts be located on more than one side of the block.

The member is further shaped for manual handling by a user. For example, the dimensions of the member may be suitable for a standard person. A standard person is a mathematical model of a person based on any suitable data that simulates a person's size, body proportions, and the like. A standard person may be based, for example, on standards for handheld equipment or data used in the carpentry or glove industry to define sizes for carpentry or working equipment.

Embodiments include that the width or a distance between opposing surfaces of the member are dimensioned so as to provide a handhold by a standard person. Design features improve manual implementation, for example, the front or back straight edge is configured to be positioned in alignment with a staple gun when the first flat surface is contacting or facing a ground surface.

Furthermore, one or more edges may be rounded so that a hand of a standard person can more easily grip around opposing surfaces, such as the front and back surfaces, or top and bottom surfaces. Also, one or more outer surfaces of the block may be rough or smooth so that the member does not easily slip out of a grip. Also, the bottom surface may be smooth for sliding the block along the ground. Alternatively, the bottom surface may be roughened for holding the block in place on the ground.

The weight of the member is kept lightweight for ease of use and portability. This can be accomplished by using lightweight materials, such as one or more of wood, ceramic, rubber, plastic, metal (e.g., aluminum, steel, etc.), as well as other materials that can be formed into a member as described and weigh within a range of 0-1 lb, 1-2 lb, 2-3 lb, 3-4 lb, and 4-5 lb. The member is further made lightweight by being hollowed, semi-hollowed, or solid.

Figure 3:
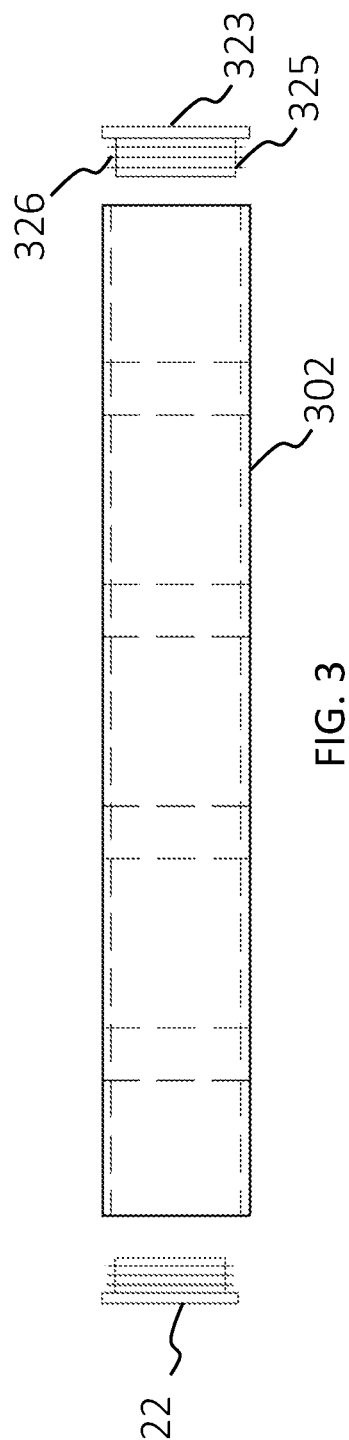
FIG. 3 shows a top view of a pipe guide.

Turning to FIGS. 3 and 4, a member 302 is shown including a hollow interior.

In addition, two removable end caps 322 and 323 are provided, one for each end of the block. The end caps 322 and 323 provide a protective layer on the ends of the block. The end cap may include rubber, plastic, metal, or other material that covers sharp edges of the block ends.

The end caps 322 and 323 may be removably inserted within the hollow interior of the block 302 and held in place with a friction fit. For example, the end caps 322 and 323 may include inserts 324 and 325 that may be inserted into the block 302. The inserts 324 and 325 may include one or more flanges 325 that extend radially outward for a friction type hold. Other types of closure may include a twist or screw fit or other locking closure.

Figure 5:
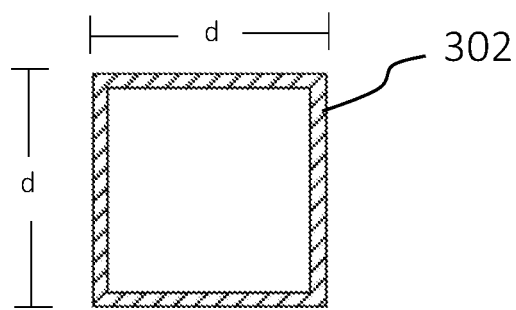
FIG. 5 shows a cross sectional view of a pipe guide.

Dimensions are shown for an exemplary member 302. FIG. 5 illustrates a cutout view along the linear straight axis of a first 105 or second end 106 of the member 302 having a hollow center with equal width d and height d. The thickness of the end cap is t, and spacing of the first cutout from an end reflects the thickness of the end cap, with a spacing of a-t. Additional cutouts are spaced with a spacing of a apart from each other. Like the first cutout, the last cutout may also be spaced with a spacing of a-t from an end. In this manner, the first cutout and last cutout have the same width from their respective ends. As previously discussed, however, the width from one or both of the first and second opposing ends 105 and 106 to nearest respective cutouts 104 may be the same distance as the distance between cutouts 104, not taking into account the end cap.

The cutouts include an arc shape or semi-circle, each arc having a radius of x. Each arc shape begins a distance y from the first flat surface 103 of the block, providing an additional depth cut into the block before the arc shape begins. The overall appearance is that of a semi-circle shape plus a rectangle shape. Alternatives include the arc shape without the additional depth or a rectangle shape without the arc shape.

Dimension text for the type of pipe tubing that may be used with the pipe guide may be indicated on the block. For example, the text may be stamped or printed on the block. Corresponding text may be indicated on the pipe tubing that will be used with the pipe guide.

The use of the pipe guide is shown in FIGS. 6, 7, 8, and 9. In FIG. 6, a user places the end of the pipe guide 100 on the ground on top of a first pipe tubing 132 and up against an end side surface of a second pipe tubing 134, with the second pipe tubing 134 is already in its desired location. The first pipe tubing 132 is fitted underneath a desired cutout to provide a desired width spacing from the second pipe tubing 134.

The pipe guide may stay resting on top of the first pipe tubing 132 to lay additional length of the first pipe tubing 132 along the ground so as to be parallel with the second pipe tubing 134.

Figure 7:
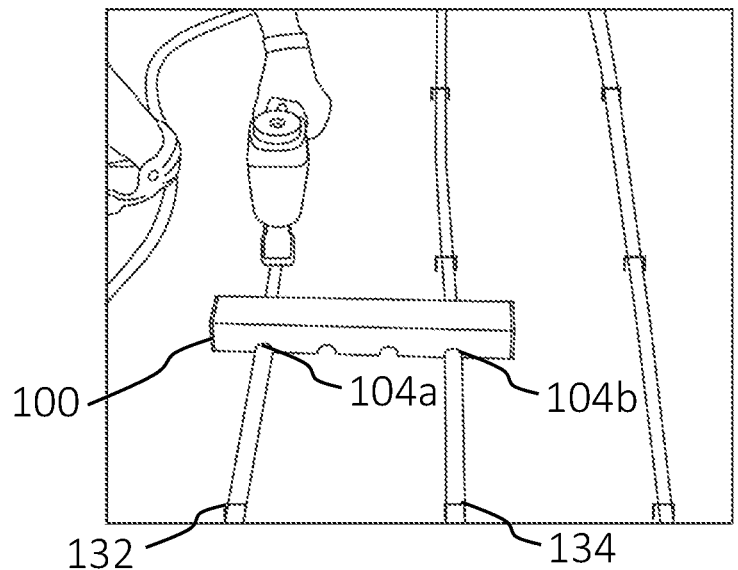
FIG. 7 shows a pipe guide in use.

In FIG. 7, the pipe guide 100 is shown in a position with a first cutout 104a on top of the first pipe tubing 132 and second cutout 104b on top of the second pipe tubing 134 so as to maintain a fixed distance between the first pipe tubing 132 and the second pipe tubing 134. A staple gun 136 is shown being used to affix the first pipe tubing 132 to the flooring 138 below.

Figure 8:
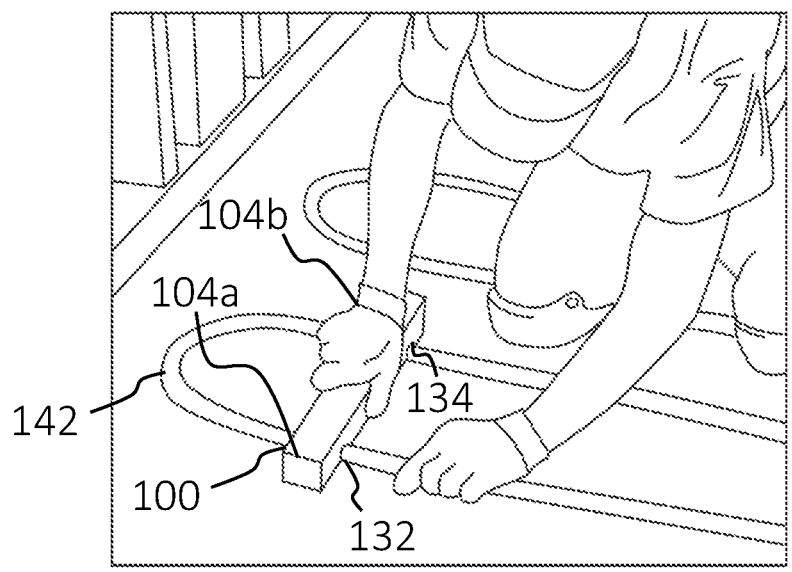
FIG. 8 shows a pipe guide in use.

In FIG. 8, a pipe guide 100 is shown with a pipe tubing 142 being bent to form a curve between two parallel portions of the pipe tubing 142, the curved position being maintained by the guide 100. One cutout 104a is on top of one portion of the pipe tubing 142 and a second cutout 104b is on top of a second portion of the pipe tubing 142.

Figure 9:
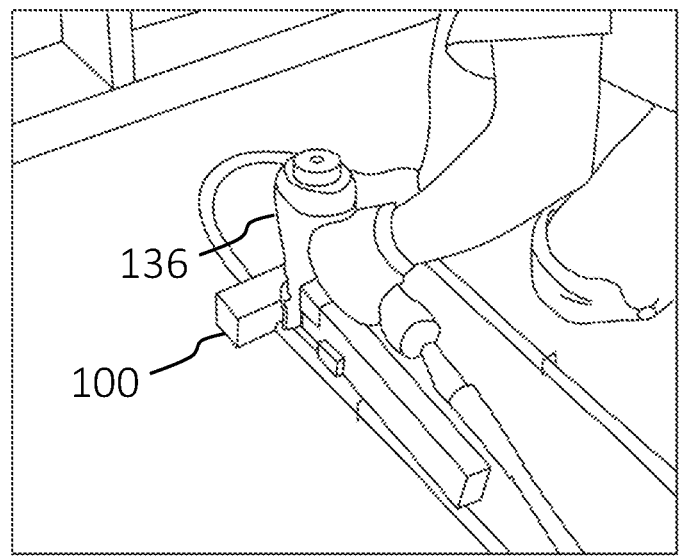
FIG. 9 shows a pipe guide in use.

In FIG. 9, the pipe guide 100 is shown in the same position as shown in FIG. 8 while a user uses a staple gun 136 to staple the pipe tubing 144 in place so as to hold the curve position as well as the parallel portions of the pipe tubing 144.

Figure 10:
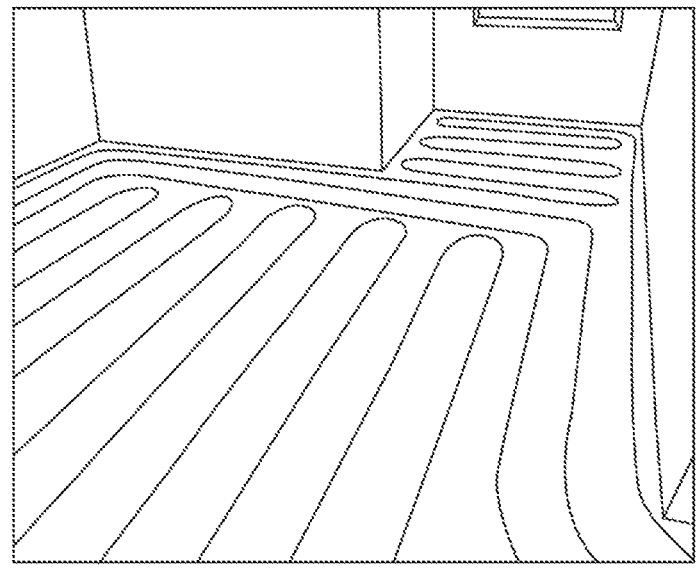
FIG. 10 shows a set of pipes having been spaced with a pipe guide.
Figure 11:
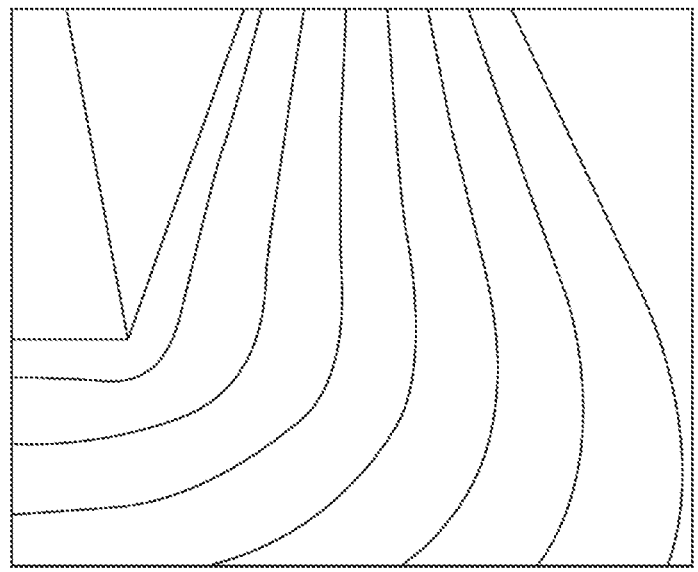
FIG. 11 shows a set of pipes having been spaced with a pipe guide.
Figure 12:
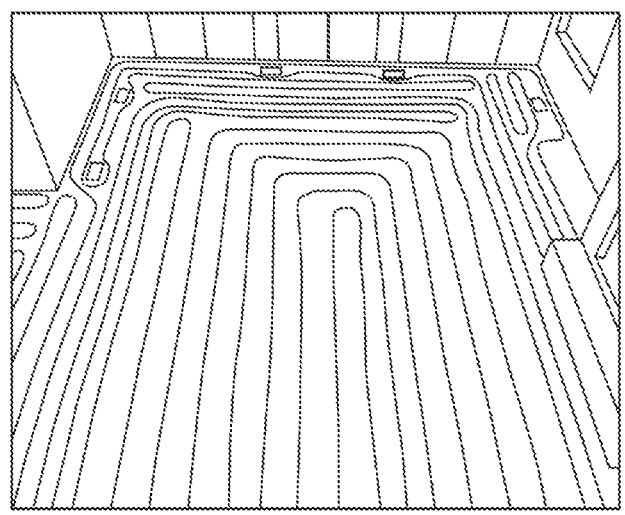
FIG. 12 shows a set of pipes having been spaced with a pipe guide.

FIGS. 10, 11, and 12 show exemplary placement of pipe tubing that are enabled by the pipe guide. This includes, for example, parallel lines, wrapping around vents, curving around corners, and desired patterns.

Some embodiments include a set of pipe guides for laying radiant pipe tubing. For example, the set may include a plurality of members, or blocks, each member having a plurality of cutouts. Each member may include an elongated member having a top surface and a bottom surface that are rectangular and opposed side surfaces that are rectangular. Opposed end surfaces may be square or rectangular.

The plurality of cutouts are located along one side of each member, the cutouts are spaced at equal distances from each other, the cutouts for each member having dimensions that are different from each other member such that pipes having different dimensions may be used with the set.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A pipe guide for laying radiant heat piping comprising:
    an elongated member elongated along a linear straight axis,
    the member having a first flat surface,
    the member having a plurality of cutouts open in the first flat surface, each cutout forming a groove with a free unobstructed path perpendicular to the axis,
    the member shaped for manual handling by a user,
    the spacing between the plurality of cutouts being equal,
    the member having a first end and a second end with a straight perpendicular edge to the axis at the flat surface, the first end and the second end configured to abut a previous pipe when aligning a new pipe with respect to the previous pipe.

2. The guide of claim 1, wherein the distance between the first or second end of the member and a nearest of the plurality of cutouts is the same as the spacing between each cutout.

3. The guide of claim 1, further comprising a second flat surface with a plurality of cutouts.

4. The guide of claim 1, further comprising at least one front or back straight edge, the front or back straight edge being perpendicular to the linear axis, the at least one front or back straight edge converging with the first flat surface to form a right angle, the at least one front or back straight edge configured to be positioned in alignment with a staple gun when the first flat surface is contacting or facing a ground surface.

5. The guide in claim 1, wherein the plurality of cutouts include a shape that is semi-circular.

6. The guide in claim 1, wherein the plurality of cutouts include a shape comprising a semi-circle and a rectangle.

7. The guide in claim 1, wherein a distance between the first or second end of the member and a nearest of the plurality of cutouts is the same as the spacing between the plurality of cutouts.

8. The guide in claim 1, wherein the member is hollowed.

9. The guide in claim 1, wherein the member is solid.

10. The guide in claim 1, further comprising at least one protective coating located at an end of the member.

11. The guide in claim 1, further comprising at least one end cap that may be removably fitted to at least one end of the member.

12. The guide in claim 11, wherein the end cap includes an insert that may be removably inserted at least partially within at least one end of the member with a screw fit or friction fit.

13. The guide in claim 11, wherein the end cap extends outward from the member by a thickness a, and a first cutout of the plurality of cutouts is located at a width of b−a, the distance between the plurality of cutouts being separated by a distance of b−a.

14. The guide in claim 1, wherein the member is made of one or more of aluminum, wood, ceramic, plastic, and steel.

15. The guide in claim 1, wherein the member includes dimension text stamped or etched into a surface of the member, the dimension text providing information for specific radiant pipes that may be used with the member.

16. The guide in claim 1, wherein each of the plurality of cutouts includes one or more unique dimensions, the one or more unique dimensions configured to be used for different pipe dimensions.

17. The guide in claim 1, wherein both a height and a width of the member are more than twice a height of the plurality of cutouts.

18. A pipe guide for laying radiant heat piping comprising,
    an elongated member is elongated along a linear straight axis,
    the member having a flat surface, and
    the member shaped for manual handling by a user,
    the member having a plurality of cutouts open in the flat surface, each cutout forming a groove with a free unobstructed path perpendicular to the axis,
    the spacing between cutouts being unequal,
    the member having at least one end with an edge configured to abut a previous pipe when aligning a new pipe,
    distance between the first or second end of the member and a nearest of the plurality of cutouts being spaced between and from ends at different ratios instead of being equally spaced apart.

19. A set of pipe guides for laying radiant heat piping, comprising:
    a plurality of members;
    a plurality of cutouts located on each member;
    each member being elongated along a linear straight axis,
    each member having a flat surface, and
    each member shaped for manual handling by a user,
    each member having a plurality of cutouts open in the flat surface, each cutout forming a groove with a free unobstructed path perpendicular to the axis,
    the spacing between cutouts being unequal,
    each member having at least one end with an edge configured to abut a previous pipe when aligning a new pipe,
    distance between the first or second end of the member and a nearest of the plurality of cutouts being the same as the spacing between cutouts, the cutouts for each member being different from each other member such that pipes having different dimensions may be used with the set.

\* \* \* \* \*